(12) United States Patent
Nicholas

(10) Patent No.: US 6,241,448 B1
(45) Date of Patent: Jun. 5, 2001

(54) GLASS CONTAINER TAKEOUT MECHANISM

(75) Inventor: James J. Nicholas, Lexington, NC (US)

(73) Assignee: Owens-Brockway Glass Container Inc., Toledo, OH (US)

( * ) Notice: Subject to any disclaimer, the term of this patent is extended or adjusted under 35 U.S.C. 154(b) by 0 days.

(21) Appl. No.: 09/199,621

(22) Filed: Nov. 25, 1998

(51) Int. Cl.[7] ................................................... C03B 35/20
(52) U.S. Cl. ..................... 414/222.01; 414/810; 414/917; 65/239; 65/241; 65/260; 294/118; 294/87.22
(58) Field of Search ............................... 414/810, 222.01, 414/917; 65/260, 239, 241; 294/118, 87.22, 87.24

(56) References Cited

U.S. PATENT DOCUMENTS

| | | | |
|---|---|---|---|
| 2,713,419 | * 7/1955 | Hayes | 65/260 |
| 3,220,566 | * 11/1965 | Rowe | 65/260 |
| 3,731,862 | * 5/1973 | Bustraan et al. | 225/4 |
| 3,913,966 | * 10/1975 | Richards | 294/118 |
| 4,137,061 | 1/1979 | Mallory et al. . | |
| 4,379,581 | 4/1983 | Perry . | |
| 4,494,973 | 1/1985 | Perry . | |
| 4,710,218 | 12/1987 | Giberti-Fornaciari . | |
| 5,507,849 | * 4/1996 | Wenz | 65/260 |
| 5,587,000 | 12/1996 | Mann et al. . | |
| 5,693,113 | * 12/1997 | Dries et al. | 65/260 |

* cited by examiner

*Primary Examiner*—Joseph A. Fischetti

(57) ABSTRACT

A takeout mechanism for simultaneously removing a plurality of glass containers from molds at a section of a glass container forming machine of the individual section type, and preferably three such glass containers in each cycle. The takeout mechanism includes a plurality of tong assemblies, one such tong assembly for each container to be removed on each operating cycle of the takeout mechanism, and a cylinder housing to which each of the takeout assemblies is secured for moving the takeout assemblies in unison to transfer the glass containers from the molds to a deadplate of the machine for cooling and further processing. Each tong assembly comprises a vertically extending fixed member, a linkage system carried by the fixed member for opening and closing an opposed pair of generally L-shaped tongs, and an opposed pair of tongs pivotably connected to the linkage system. A nut and bolt assembly is provided to connect the tongs to the linkage system to permit adjustment of the elevation of the tongs, and a threaded member passes through one of the opposed pair of tongs to engage the fixed member to permit adjustment of the position of the opposed pair of tongs in a horizontal plane relative to the position of the fixed member.

6 Claims, 2 Drawing Sheets

GLASS CONTAINER TAKEOUT MECHANISM

FIELD OF THE INVENTION

This invention relates to a mechanism for removing glass containers from molds of a forming machine. More particularly, this invention relates to a takeout mechanism for removing glass containers from second stage or blow molds of a multiple cavity glass container forming machine of the individual section (I.S.) type.

BACKGROUND OF THE INVENTION

U.S. Pat. No. 4,494,973 (Perry), the disclosure of which is incorporated by reference herein, describes a known prior art takeout mechanism for a multiple cavity glass container forming machine of the I.S. type. A takeout mechanism of this type includes a plurality of spaced apart takeout elements, usually called tongs, arranged in a straight line and carried by common structure, for simultaneously grasping a multiplicity of freshly formed glass containers at their final molding positions at a section of an I.S. machine and transferring the containers to a dead plate for cooling and further processing. In the teachings of the 1973 patent, each of the containers is grasped by the takeout tongs below the level of a bead, which is often called a transfer bead, that is positioned just below the threaded or otherwise configured closure receiving portion on the neck of the container, which is often referred to as the finish of the container. In the practice of the invention of the '973 patent, the mold halves defining the mold cavity in which the container was blown were caused to part before the container was engaged by the tongs, and this made it possible for the container to tilt if needed to accommodate any slight misalignment between the container and the takeout tongs intended to grasp such container. U.S. Pat. No. 4,379,581 (Perry), the disclosure of which is also incorporated by reference herein, contains a further description of a known prior art takeout tong mechanism for a multiple cavity I.S. glass container forming machine.

Modern glass container forming practice has eliminated the need for including a transfer bead in each container being formed by designing tongs with complementary internally threaded container engaging elements, so as to be able to engage a container by its externally threaded finish rather than below its transfer bead. This technique, however, makes precise vertical positioning of the tong elements much more important than it was when the tong elements were used to grasp a container below its transfer bead. Further, to speed up the container forming process, it is now preferred to have the takeout tong elements grasp the container before the mold halves have parted. This makes precise positioning of the tongs relative to the container in a horizontal plane more important than it was when the tongs were used to remove containers that were free to tilt to accommodate misalignment with the tongs, and the need to prevent such misalignment is especially important in I.S. machines equipped to simultaneously form three (triple gob) or four (quad) containers at each machine section, since the requisite degree of alignment in such a situation cannot always be achieved simply by adjusting the positions of the tongs in unison.

BRIEF DESCRIPTION OF THE INVENTION

According to the present invention, there is provided an improved takeout mechanism for removing blown containers from the blow molds at a section on a glass container forming machine of the I.S. type. In the takeout mechanism of the present invention, which has particular utility for triple gob and quad I.S. machines, the portion of each tong head is adjustable in a vertical direction relative to each other tong head, and to the support structure from which the tong heads are suspended, so that each tong head will be positioned to grasp the finish of a container precisely at a proper elevation. Further, the position of each tong head is adjustable in a horizontal direction relative to each other tong head so that each tong head will be precisely positioned to grasp the container even if the container is not at liberty to tilt because the mold halves defining the cavity in which it was blown have not parted sufficiently at the time of grasping to permit the container to tilt to accommodate any misalignment in a horizontal plane between the tong head and the container.

Accordingly, it is an object of the present invention to provide an improved takeout mechanism for removing glass containers from a section of an I.S. glass container forming machine. It is a further object of the present invention to provide a takeout mechanism for a multiple cavity I.S. machine that is capable of having the vertical position of each of its individual takeout elements adjusted independently of the vertical positions of the other takeout elements to be able to grasp a container to be removed at a precise elevation on its finish. It is also an object of the present invention to provide a takeout mechanism of the foregoing character that is capable of having the horizontal position of each of its individual takeout elements adjustable independently of the horizontal position of the other takeout elements to be able to grasp a container to be removed at a precise horizontal position, and thereby eliminate the need for the container to tilt from its molding position before its removal.

For a further understanding of the present invention and the objects thereof, attention is directed to the drawing and the following brief description thereof, to the detailed description of the preferred embodiment and to the appended claims.

DETAILED DESCRIPTION OF THE PREFERRED EMBODIMENT

Figure 1:
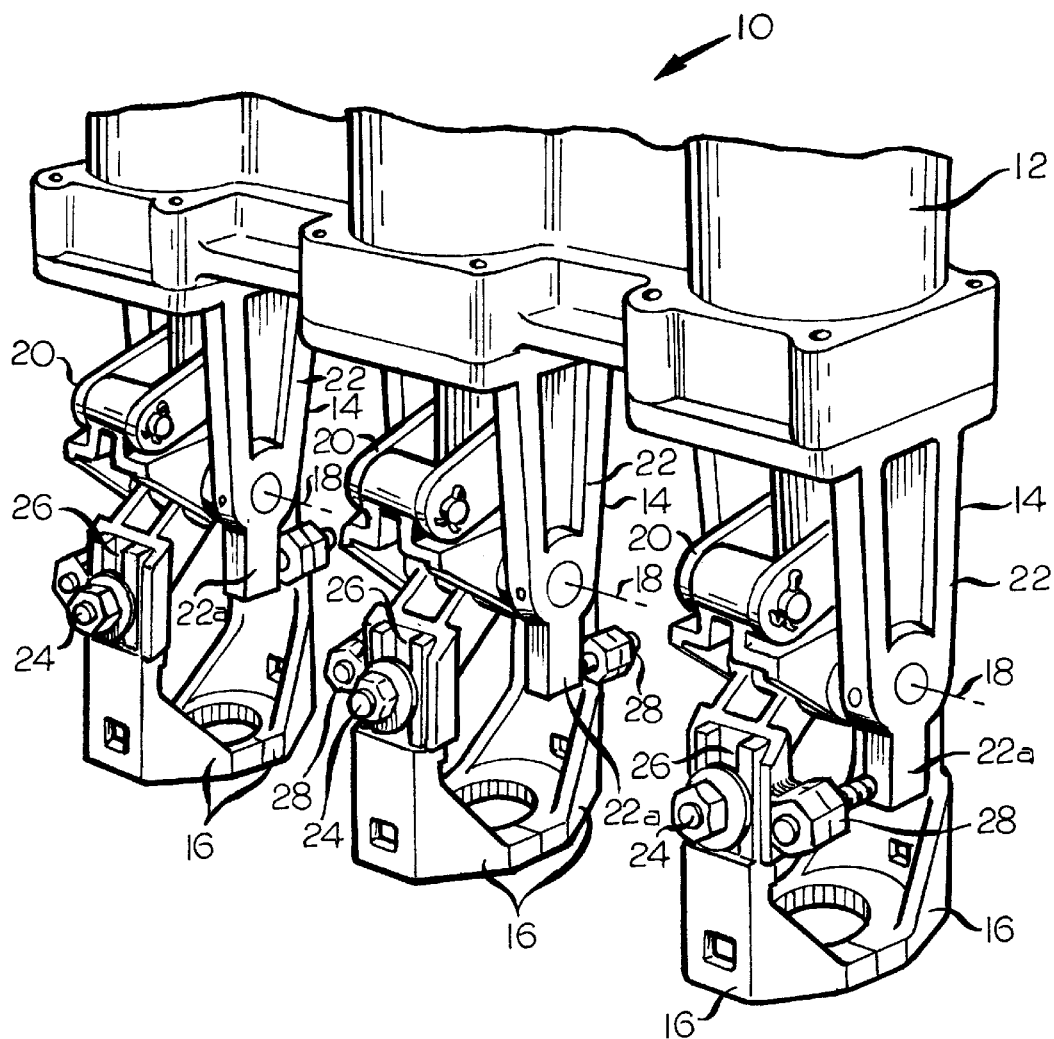
FIG. 1 is a fragmentary, perspective view of a takeout mechanism for a triple gob glass container forming machine of the I.S. type according to the preferred embodiment of the present invention.
Figure 2:
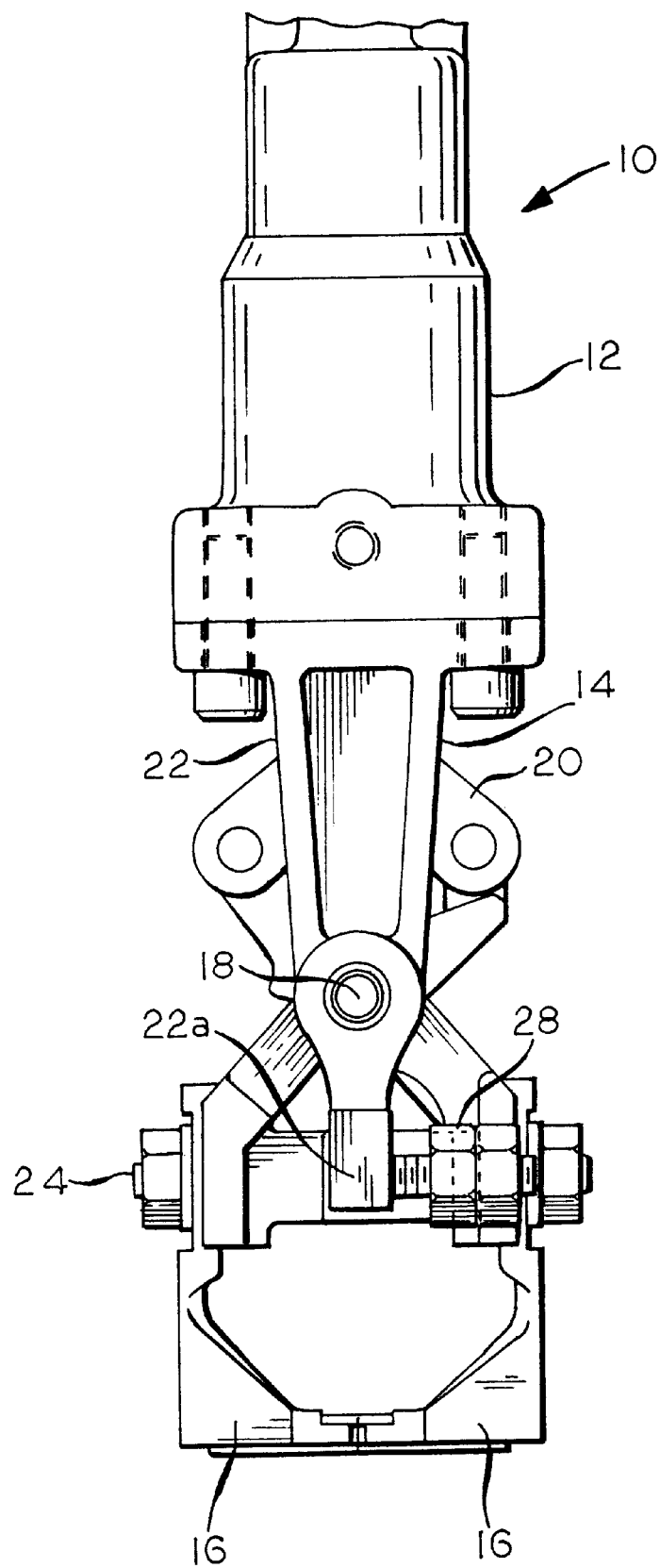
FIG. 2 is an end view of the takeout mechanism of FIG. 1.

A takeout mechanism according to the preferred embodiment of the present invention is identified generally by reference numeral 10 in the drawing, and the takeout mechanism 10 includes a cylinder housing 12 that serves as a carrier for one or more tong assemblies 14, shown as three such tong assemblies 14, which is the required number for a triple gob I.S. machine, that is, a machine that forms three containers at a time at each of its machine sections. Each of the tong assemblies 14 has a tong head that is made up an opposed pair of tongs 16, which simultaneously pivot about an axis 18 that is spaced from the distal ends of the tongs 16 to open and close the tongs 16, the opening and closing of each pair of tongs 16 being actuated by a pneumatic cylinder (not shown) that is housed in the cylinder housing 12. The pneumatic cylinder operates through a linkage system 20, which may be in the form of an anti-winking linkage of the type described in the aforesaid '581 patent to open and close the tongs 16 with respect to one another.

Each tong assembly 14 is used to simultaneously close on the upper regions of three blown containers in blow molds at a section of an I.S. machine and to then transfer such containers to a deadplate of the I.S. machine for cooling and processing, as is known in the art. The alternate extension and retraction of a cylinder (not shown) carried by each tong assembly 14, operating through the linkage 20, is effective to separate the tongs 16 of such tong assembly 14 to release such blown containers at the deadplate, and to reunite such tongs 16 at the blow molds when the takeout mechanism 10 is ready to begin a repeat of the process, respectively.

Each tong assembly 14 includes a yoke-shaped fixed member 22, which is fixedly suspended from the cylinder housing 12 and has the axis 18 passing therethrough, and each of the tongs 16 carried by the tong assembly 14 is suspended from the linkage system 20 carried by such tong assembly 14 at an elevation that is adjustable. The adjustment of the elevation of the tongs 16 is accomplished through the use of a bolt and nut assembly 24 that is received in a slot 26 of each of the tongs 16, which are generally L-shaped in configuration. Thus, the elevation of the tongs 16 at the time of engagement of a blown container may be very precisely positioned relative to the elevation of the fixed member 22, and relative to the elevation of the tongs 16 of the other tong assemblies 14, so as to be able to grasp the blown container it is intended to engage by its threaded or otherwise configured finish, as opposed to grasping the container at an elevation below a transfer bead underlying the finish as in the case of prior art takeout mechanisms, which does not require a comparable degree of accuracy in the positioning of the elevation of the tongs 16.

The position of each set of tongs 16 of each of the tong assemblies 14 is adjustable in a horizontal plane independently of the position of each set of tongs 16 of each of the other tong assemblies 14 so as to be able to accurately grasp a container at a blow mold of an I.S. machine section without the need for any tilting of the container to compensate for any misalignment of the tongs 16 with respect to the container to be grasped thereby. This adjustment is accomplished by the use of a threaded member 28 that passes through a threaded opening in one of the tongs 16 of each pair of tongs 16 to engage a distal end extension 22a of the fixed member 22. By advancing or retracting the threaded member 28 relative to the extension 22a, the angular position of the tongs 16 of each tong assembly 14 will be adjusted about the axis 18, and because the arc of movement of the pair of tongs 16 will be relatively small, and the radius of its movement about the axis 18 will be relatively long, the adjustment of the position of the tongs 16 of each pair of tongs 16 by the use of the threaded member 28 will, for all practical purposes, occur in a horizontal plane.

Although the best mode contemplated by the inventor for carrying out the present invention as of the filing date hereof has been shown and described herein, it will be apparent to those skilled in the art that suitable modifications, variations and equivalents may be made without departing from the scope of the invention, such scope being limited solely by the terms of the following claims and the legal equivalents thereof.

What is claimed is:

1. A takeout mechanism for removing a plurality of glass containers from molds at a section of a glass container forming machine of the individual section type, said takeout mechanism comprising:

a plurality of tong assemblies, one of said tong assemblies for each of the glass containers to be removed, each of said tong assemblies comprising;
   a fixed member, extending in a given direction
   linkage means carried by said fixed member for opening and closing an opposed pair of tongs,
   an opposed pair of tongs carried by said linkage means and being pivotable with respect to said linkage means,
   means for adjustably securing said opposed tongs to said linkage means to permit spacing between said opposed pair of tongs and said fixed member to be adjusted solely in a direction extending parallel to the given direction; and means connected to each of said plurality of tong assemblies for moving said plurality of said tong assemblies in unison;

wherein each of said opposed pair of tongs is pivotable with respect to said linkage means about a common axis, and wherein said each said tong assemblies further comprises;

threaded means separate from the means for adjustably securing, said threaded means carried by only one tong of each of said opposed pair of tongs and for engaging said fixed member to adjust the position of said opposed tongs, in unison, in a plane extending transversely of the orientation of said fixed member.

2. A takeout mechanism according to claim 1 wherein said a plurality of tong assemblies comprises at least three tong assemblies.

3. A takeout mechanism according to claim 1 wherein said fixed member has a spaced apart pair of legs, said linkage means being pivotable about an axis extending through each of said opposed pair of legs of said fixed member.

4. A takeout mechanism according to claim 1 wherein said fixed member extends vertically and said means for adjustably securing permits adjustment of an elevation of said opposed pair of tongs.

5. A takeout mechanism according to claim 4 wherein said threaded means adjusts the position of said opposed pair of tongs in a horizontal plane.

6. A takeout mechanism according to claim 4 wherein said each of said tongs comprises a generally L-shaped member;
   wherein each of said L-shaped members has a vertically extending leg with a vertically extending slot in said vertically extending leg; and
   wherein said means for adjusting comprises a bolt and nut assembly passing transversely through said vertically extending slot of said vertically extending leg of said L-shaped member.

* * * * *